UNITED STATES PATENT OFFICE.

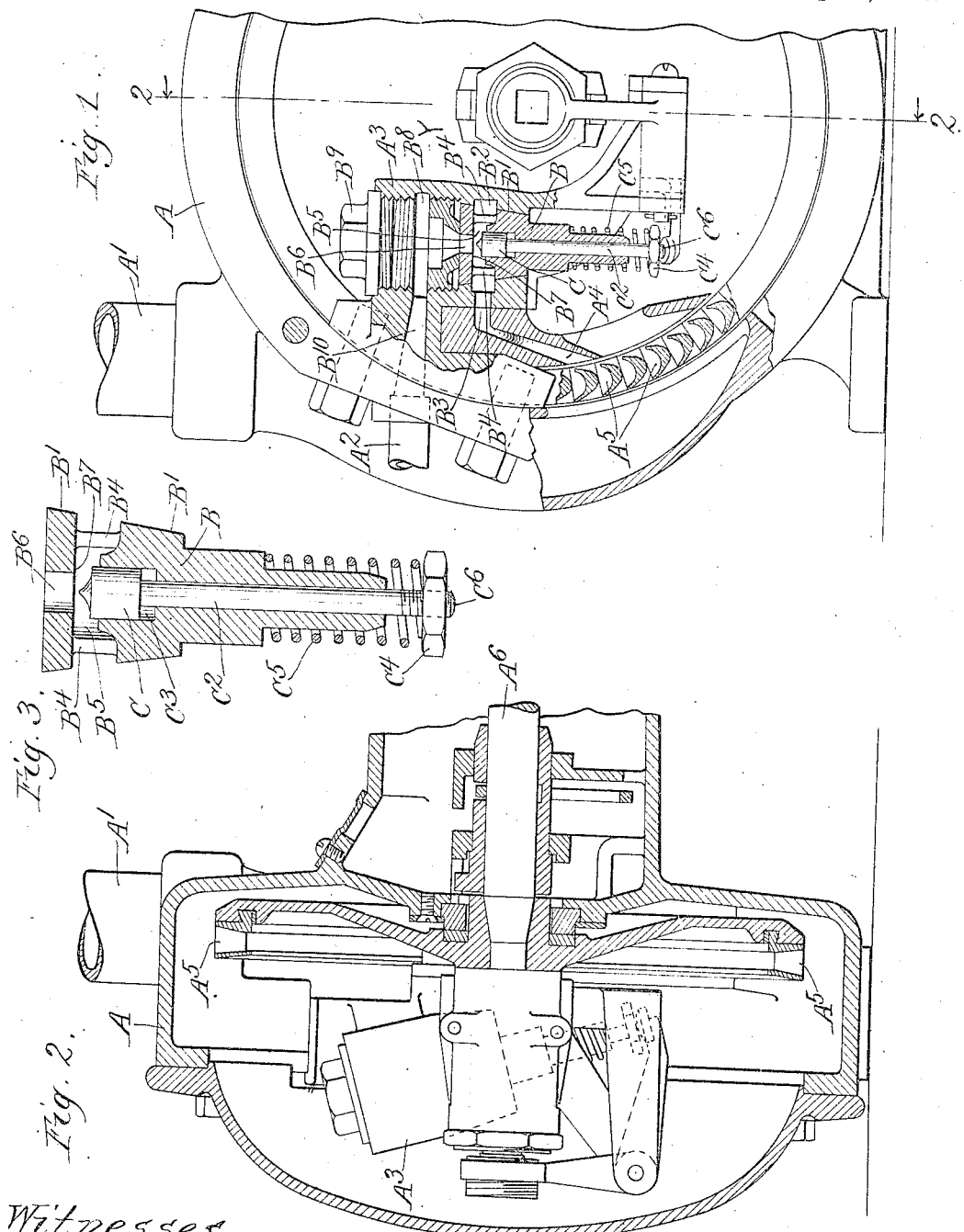

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

UNBALANCED VALVE FOR TURBINES.

1,134,317.

Specification of Letters Patent. Patented Apr. 6, 1915.

Application filed August 9, 1913. Serial No. 783,968.

*To all whom it may concern:*

Be it known that I, CHARLES W. DAKE, a citizen of the United States, residing at Chicago, in the county of Cook and State of Illinois, have invented a certain new and useful Improvement in Unbalanced Valves for Turbine-Engines, of which the following is a specification.

My invention relates to improvements in valves for turbine engines and the like or for any other situation wherein steam or fluid under pressure must be controlled by a sensitive controlling mechanism.

It is illustrated diagrammatically in one form in the accompanying drawings, wherein—

Figure 1 is an end elevation of a turbine with parts in section and parts broken away; Fig. 2 is a section on the line 2—2 of Fig. 1, and Fig. 3 is a detail sectional view of the valve cage and valve.

Like parts are indicated by like letters throughout the several figures.

A is a turbine housing.

$A^1$ is an exhaust pipe leading from the turbine housing.

$A^2$ is a steam pipe leading to the turbine.

$A^3$ is a valve housing mounted on the turbine housing.

$A^4$ is an expanding steam nozzle leading from the valve housing $A^3$ and discharging into the buckets $A^5$ of a bucket wheel.

$A^6$ is the turbine shaft which will in actual practice carry a governor of some kind or other not here shown, since any form of governor might be made to do.

B is a valve cage located in the valve housing $A^3$ and held therein by any suitable means not here specifically illustrated. This valve cage is conical as indicated to engage the conical seat in the valve housing $A^3$ as at $B^1$. An annular ring or channel $B^2$ about the cage B communicates with the nozzle $A^4$ by means of the passage $B^3$. This annular ring communicates by means of the ports $B^4$ with the chamber $B^5$ in the interior of the valve cage. Communicating with the chamber $B^5$ through the top thereof is a passage $B^6$ terminating in a valve seat B, communicating with the chamber $B^8$ in the housing $A^3$. This chamber $B^8$ is closed by a plug $B^9$ and communicates by means of the passage $B^{10}$ with the steam supply pipe $A^2$.

C is a valve comprising a sliding plug slidable in the valve cage B in opposition to the valve seat $B^7$. This sliding plug valve is of a comparatively large cross sectional area and mounted on a valve stem $C^2$. This plug reciprocates in a cylindrical chamber $C^3$ beneath the steam chamber $B^5$ and separated therefrom by this plug. The valve stem $C^2$ terminates in an adjusting nut $C^4$ surrounded by a spiral spring $C^5$ which is compressed between the nut $C^4$ and the valve plug $B^9$. The head $C^6$ of the valve stem is provided to engage in a suitable governing actuating means not here shown to control the operation of the valve.

It will be evident that, while I have shown in my drawings an operative device, still many changes might be made in size, shape and arrangement of parts without departing materially from the spirit of my invention. I wish therefore, that my drawings be regarded as in a sense diagrammatic.

The use and operation of my invention are as follows: When steam is admitted to the steam chamber through the steam pipe it passes through a short passage of the valve seat into the lower steam chamber, thence through the passages indicated to the nozzle which operates the turbine. As the rotation of the spider rises, the governor being set for a predetermined speed springs into action and tends to raise the plug valve against the steam pressure closing it finally to shut off the steam if the speed rises too high. By holding it normally in that position at which a proper desired speed is attained, it is understood that as the speed rises, the force with which the governor acts and the rapidity with which it acts also increases and it is necessary to provide some means for cushioning this governing effect. The valve itself provides this means since it is unbalanced and since its operation in response to the governor is resisted by the pressure of the steam supply, particularly upon the unbalanced portion.

I claim:

1. The combination with a turbine of a valve cage removably socketed therein, an unbalanced valve mounted in said cage to control the motive fluid to the turbine and a governor means to control the movement of said valve.

2. The combination with a turbine of a valve cage removably socketed in position, an unbalanced valve mounted in said cage, a governor and means responsive thereto for actuating said valve to control the motive fluid and means comprising said valve for increasing the resisting action of the governor as the valve closes.

3. The combination with a housing of a valve cage socketed therein, a steam chamber located above said valve cage, a removable plug closing one side of said chamber the valve cage being located in line with said plug and on the opposed side of the steam chamber, and means for holding said valve cage in position, said valve cage and holding means being free to be withdrawn only when the plug has been removed.

4. The combination with a steam engine governor of a slidably mounted plug valve, a valve seat in line with said plug valve, a steam supply controlled by said valve, a discharge from said valve in a direction at right angles to the line of movement thereof, said valve being exposed to the steam only on the side opposed to the seat.

5. The combination with a steam engine governor of a slidably mounted plug valve actuated thereby, a valve seat in line with the movement of said valve, a steam supply discharging through said valve seat, a steam supply discharging away from said valve seat substantially in a direction at right angles to the line of movement of the valve.

6. The combination with a steam engine governor of a slidably mounted plug valve actuated thereby, a valve seat in line with the movement of said valve, a steam supply discharging through said valve seat, a steam supply discharging away from said valve seat substantially in a direction at right angles to the line of movement of the valve, said valve having a conical end the apex of which directs toward the direction from which the steam current controlled thereby impinges upon the valve.

In testimony whereof, I affix my signature in the presence of two witnesses this 26th day of July, 1913.

CHARLES W. DAKE.

Witnesses:
LAUREL M. DOREMUS,
MINNIE M. LINDENAY.